United States Patent
Ishikawa et al.

(10) Patent No.: US 12,556,064 B2
(45) Date of Patent: Feb. 17, 2026

(54) MOTOR WITH END BELL AND ELECTRICAL ELEMENT HOLDER

(71) Applicant: MABUCHI MOTOR CO., LTD., Chiba (JP)

(72) Inventors: Naoki Ishikawa, Chiba (JP); Kouichi Hashimoto, Chiba (JP); Yasuaki Matsuoka, Chiba (JP); Michio Tsunoda, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 273 days.

(21) Appl. No.: 18/451,844

(22) Filed: Aug. 18, 2023

(65) Prior Publication Data

US 2024/0072609 A1    Feb. 29, 2024

(30) Foreign Application Priority Data

Aug. 26, 2022  (JP) .................... 2022-134812

(51) Int. Cl.
  *H02K 9/06*  (2006.01)
  *H02K 11/026*  (2016.01)
  *H02K 11/26*  (2016.01)

(52) U.S. Cl.
  CPC ............. *H02K 9/06* (2013.01); *H02K 11/026* (2013.01)

(58) Field of Classification Search
  CPC ........... H02K 5/20; H02K 5/207; H02K 9/02; H02K 9/04; H02K 9/06; H02K 11/026
  See application file for complete search history.

(56) References Cited

U.S. PATENT DOCUMENTS

| | | | | |
|---|---|---|---|---|
| 5,053,657 | A * | 10/1991 | Ikegami | ........... H02K 9/06 310/63 |
| 6,294,850 | B1 * | 9/2001 | Yui | ............. H02K 5/1672 29/826 |
| 2009/0072656 | A1 * | 3/2009 | Eisert | ............. H01R 39/385 310/244 |
| 2010/0045135 | A1 * | 2/2010 | Lau | ............. H01R 39/383 310/239 |

(Continued)

FOREIGN PATENT DOCUMENTS

CN  201515271 U   6/2010
JP  3345365 B2   11/2002

(Continued)

OTHER PUBLICATIONS

Office Action in JP Application No. 2022-134812 mailed Jun. 25, 2024, 8pp.

*Primary Examiner* — Eric Johnson
(74) *Attorney, Agent, or Firm* — HAUPTMAN HAM, LLP (57) ABSTRACT

A motor includes a bottomed cylindrical housing incorporating a rotor that rotate integrally with a shaft and a stator, and an end bell having an end plate that closes an opening of the housing and a holder that is provided between the rotor and the end plate in an axial direction and to which an electrical element is attached. The end plate has an air hole penetrating the end plate in the axial direction. The holder includes an attachment portion to which the electrical element is attached, and has an insertion hole through which the shaft is inserted. At least part, of the attachment portion, overlapping the air hole when viewed in the axial direction has a cutout portion.

11 Claims, 5 Drawing Sheets

(56) References Cited

U.S. PATENT DOCUMENTS

| | | | |
|---|---|---|---|
| 2015/0042214 A1* | 2/2015 | Osborne | H01R 39/385 |
| | | | 310/60 R |
| 2017/0005547 A1 | 1/2017 | Chou | |
| 2022/0255405 A1* | 8/2022 | Saito | H01R 39/383 |

FOREIGN PATENT DOCUMENTS

| | | |
|---|---|---|
| JP | 2017017985 A | 1/2017 |
| JP | 2019068670 A | 4/2019 |
| JP | 6813886 B2 | 1/2021 |
| WO | 2021010307 A1 | 1/2021 |

\* cited by examiner

FIG. 1

THE OTHER OF
AXIAL DIRECTION ⟵⟶ ONE OF
AXIAL DIRECTION

MOTOR WITH END BELL AND ELECTRICAL ELEMENT HOLDER

RELATED APPLICATIONS

The present application claims priority to Japanese Application No. 2022-134812 filed Aug. 26, 2022, the disclosure of which is hereby incorporated by reference herein in its entirety.

BACKGROUND

Technical Field

The present disclosure relates to a motor in which an electrical element is attached to an end bell that closes an opening of a housing.

Related Art

In the related art, a motor in which electrical elements are attached to an end bell that closes an opening of a housing is known. For example, Japanese Patent No. 6813886 discloses a motor in which a plurality of electrical elements such as a choke coil, a capacitor, and a resistor is attached to an end cap structure (end bell) that closes a motor case (housing). In Japanese Patent No. 6813886, each electrical element is attached to a holding portion provided on a face of an end cap structure.

In addition, a motor is known in which a vent for taking in air for cooling the inside thereof from the outside of the motor is provided to penetrate the end bell (see Japanese Patent No. 3345365).

SUMMARY

As in Japanese Patent No. 6813886, it is not easy for an end bell to which an electrical element is attached to have a vent for taking in cooling air. For example, in a case where a vent as disclosed in Japanese Patent No. 3345365 has an end bell of Japanese Patent No. 6813886, a holding portion for holding an electrical element overlaps the vent, so that intake of air from the vent may be hindered or a flow of air may be deteriorated, and a sufficient cooling effect may not be obtained.

The present disclosure has been made in view of such a problem, and an object of the present disclosure is to provide a motor in which air can be easily taken into the motor even when an electrical element is attached to an end bell, and a cooling effect is enhanced. It is to be noted that the present disclosure is not limited to this object, and it is another object of the present disclosure to achieve operational effects derived from each configuration described in the embodiments for carrying out the disclosure described later, and that cannot be obtained by the technique in the related art.

The disclosed motor can be realized as an aspect or an application example disclosed below, and solves at least part of the above problems.

(1) A motor disclosed herein includes a bottomed cylindrical housing incorporating a rotor that rotates integrally with a shaft and a stator disposed opposite to the rotor in a radial direction of the shaft, and an end bell having an end plate that closes an opening of the housing and a holder that is provided between the rotor and the end plate in the axial direction of the shaft and to which an electrical element is attached. The end plate has an air hole penetrating the end plate in the axial direction, the holder has an attachment portion to which the electrical element is attached and an insertion hole through which the shaft is inserted, and at least part, of the attachment portion, overlapping the air hole when viewed in the axial direction has a cutout portion.

(2) In the case (1), it is preferable that the electrical element be adhesively fixed in a state of being placed on a placement face of the attachment portion. In this case, it is preferable that the attachment portion have a recess recessed from the placement face at a position away from an end edge forming the cutout portion.

(3) In the case (1) or (2), it is preferable that the electrical element be a cylindrical choke coil in which a ferrite core is accommodated on the center side. In this case, it is preferable that the attachment portion have an end placement portion on which both end portions of the choke coil in the center line direction of the choke coil are placed, and the part excluding the end placement portion is a cutout portion.

(4) In the case of (3) in the case of (2), it is preferable that the capacity of the recess be substantially equal to the amount of the adhesive applied to each of the both end portions. In this case, it is preferable that each of the end placement portions have the recess.

(5) In any one of the above cases (1) to (4), it is preferable that the end plate have another air hole penetrating the end plate in the axial direction at a position away from the air hole and not overlapping the attachment portion when viewed in the axial direction. In this case, it is preferable that the holder have a through hole at least part of which overlaps the another air hole when viewed in the axial direction, and have one hole where the through hole, the insertion hole, and the cutout portion are connected.

(6) In any one of the above (1) to (5), it is preferable that the holder include a cylindrical peripheral wall portion fitted in the housing and a support portion that supports the brush. In this case, it is preferable that the cutout portion be cut out from the rotation center side of the shaft and connected to the insertion hole.

(7) In any one of the above cases (1) to (6), it is preferable that the motor include a fan disposed between the rotor and the holder in the axial direction. In this case, it is preferable that the housing have a lateral hole penetrating in the radial direction at a position same as that the fan in the axial direction.

According to the disclosed motor, air can be easily taken into the motor even when an electrical element is attached to the end bell. Accordingly, the cooling effect inside the motor can be enhanced.

DETAILED DESCRIPTION

A motor as an embodiment will be described with reference to the drawings. The embodiments described below are merely examples, and there is no intention to exclude the application of various modifications and techniques that are not explicitly described in the following embodiments. Each configuration of the present embodiment can be variously modified and implemented without departing from the spirit thereof. In addition, selection can be made as necessary, or a combination can be made as appropriate.

[1. Configuration]

Figure 1:
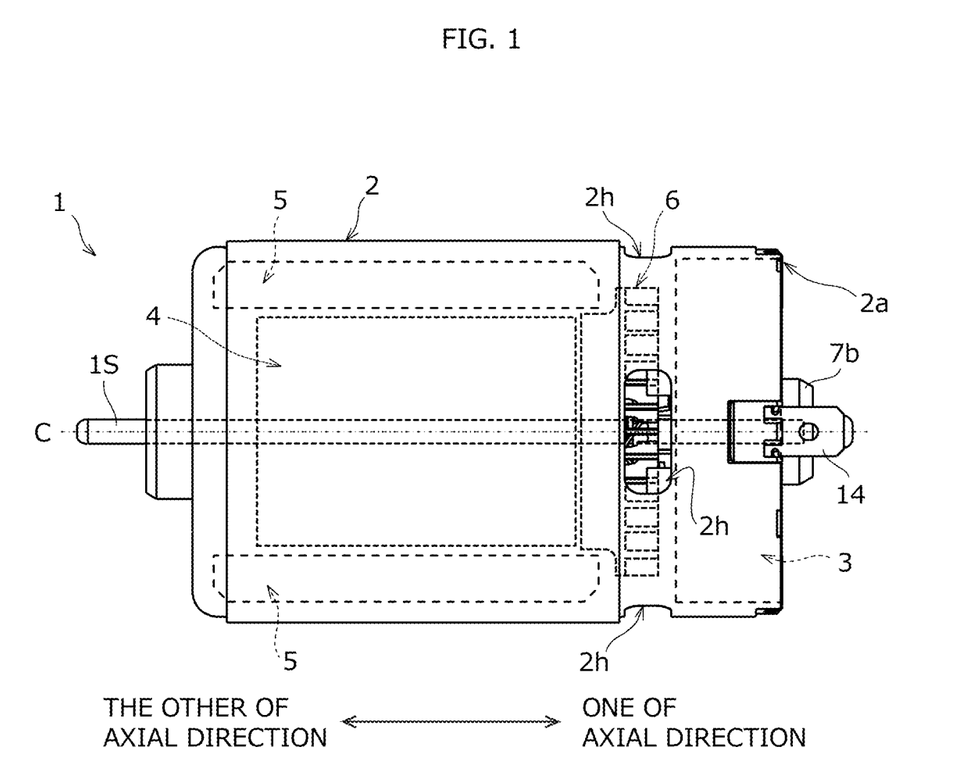
FIG. 1 is a side view of a motor according to an embodiment.

FIG. 1 is a side view of a motor 1 of the present embodiment. The motor 1 includes a shaft 1S as an output shaft. Hereinafter, a direction in which the shaft 1S extends is referred to as an axial direction, a direction orthogonal to the axial direction and away from the rotation center C of the shaft 1S and a direction toward the rotation center C are referred to as a radial direction (or radially outside, radially inside), and a direction orthogonal to the axial direction and around the rotation center C of the shaft 1S is referred to as a circumferential direction.

The motor 1 is, for example, a permanent magnet field type brushed inner rotor DC motor, and includes a bottomed cylindrical housing 2 and an end bell 3 that closes an opening 2a in one of the axial direction of the housing 2. That is, in the present embodiment, the opening 2a side direction of the housing 2 is referred to as "one of the axial direction", and the opposite direction (the bottom face side of the housing 2) is referred to as "the other of the axial direction". The housing 2 incorporates a rotor 4 that rotates integrally with the shaft 15, and a cylindrical stator 5 disposed radially outside the rotor 4 so as to face the rotor 4. A brush 11 (see FIG. 3) in sliding contact with a commutator (not illustrated) of the rotor 4 is supported by the end bell 3.

As illustrated in FIG. 1, the housing 2 of the present embodiment further incorporates a fan 6 for taking air into the housing 2 (the inside of the motor 1). The air introduced into the housing 2 cools the heat generating portions (mainly the brush 11 and the commutator). The fan 6 is disposed between the rotor 4 and the end bell 3 beyond the commutator of the rotor 4 in the other of the axial direction, and rotates integrally with the shaft 18 together with the rotor 4. The housing 2 has a plurality of lateral holes 2h penetrating the housing 2 in the radial direction at a position same as that of the fan 6 in the axial direction (that is, a position overlapping the fan 6 when viewed from the radial direction). The lateral hole 2h functions as a discharge port for discharging air taken into the housing 2 by the rotation of the fan 6 to the outside of the housing 2. Here, the housing 2 having four lateral holes 2h disposed to be shifted by 90 degrees in the circumferential direction is exemplified.

Figure 2:
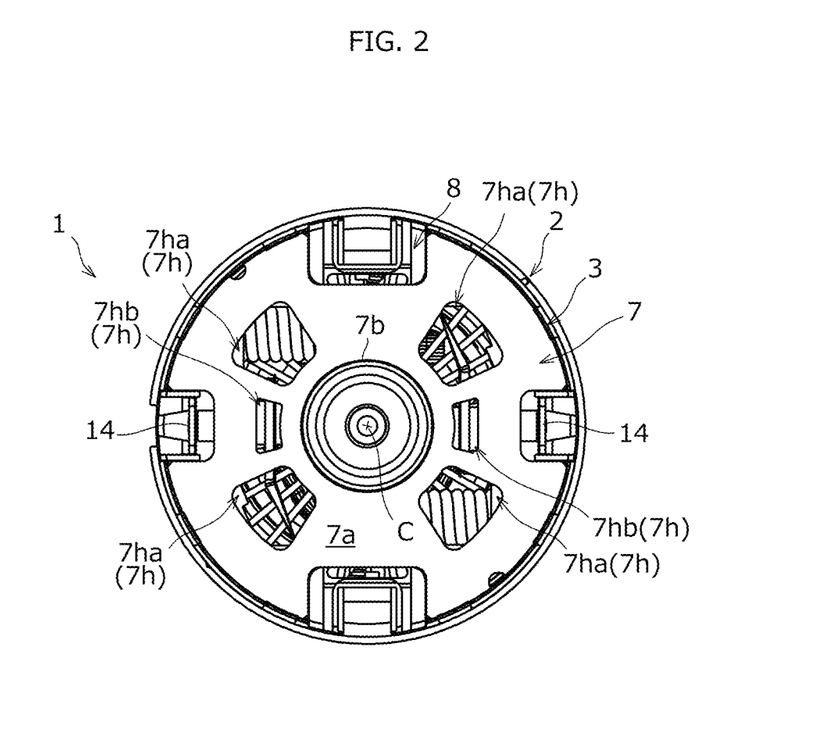
FIG. 2 is a front view of the motor of FIG. 1 when viewed from one of the axial direction.

The end bell 3 includes an end plate 7 that closes the opening 2a of the housing 2 and a holder 8 that supports the brush 11. As illustrated in FIG. 2, the end plate 7 is a lid member disposed on the farthest one side in the axial direction of the end bell 3, and has a flat plate-shaped flat portion 7a developed perpendicularly to the axial direction. The flat portion 7a has an outer shape corresponding to the shape of the opening 2a of the housing 2. Here, the disk-shaped flat portion 7a is exemplified. The outer peripheral edge of the flat portion 7a may have a cutout for preventing electrical connection with a power supply terminal 14 (described later) attached to the holder 8. In addition, as illustrated in FIGS. 1 and 2, the end plate 7 may have a recess 7b in which a bearing that rotatably supports the end of the shaft 15 in one of the axial direction is internally fitted on the radially inner side (hereinafter, also simply referred to as "inner side").

As illustrated in FIG. 2, the flat portion 7a has a plurality of air holes 7h penetrating the flat portion 7a (end plate 7) in the axial direction. The air hole 7h functions as an intake port for sucking air into the housing 2. Here, the end plate 7 having four main air holes 7ha and two sub air holes 7hb is exemplified. The four main air holes 7ha all have the same shape, and have a substantially trapezoidal shape in which the radially outer end edge is longer than the radially inner end edge, and are spaced apart from each other and disposed at substantially equal intervals (that is, shifted by approximately 90 degrees) in the circumferential direction. The two sub air holes 7hb have the same shape, and have a substantially trapezoidal shape in which the radially outer end edge is longer than the radially inner end edge as in the main air hole 7ha. The sub air holes 7hb each have an opening area smaller than that of the main air hole 7ha, and are disposed opposite to each other across the rotation center C in the radial direction between two main air holes 7ha adjacent in the circumferential direction. The two sub air holes 7hb are preferably disposed in the same phase as the position of the brush 11 described later.

Figure 3:
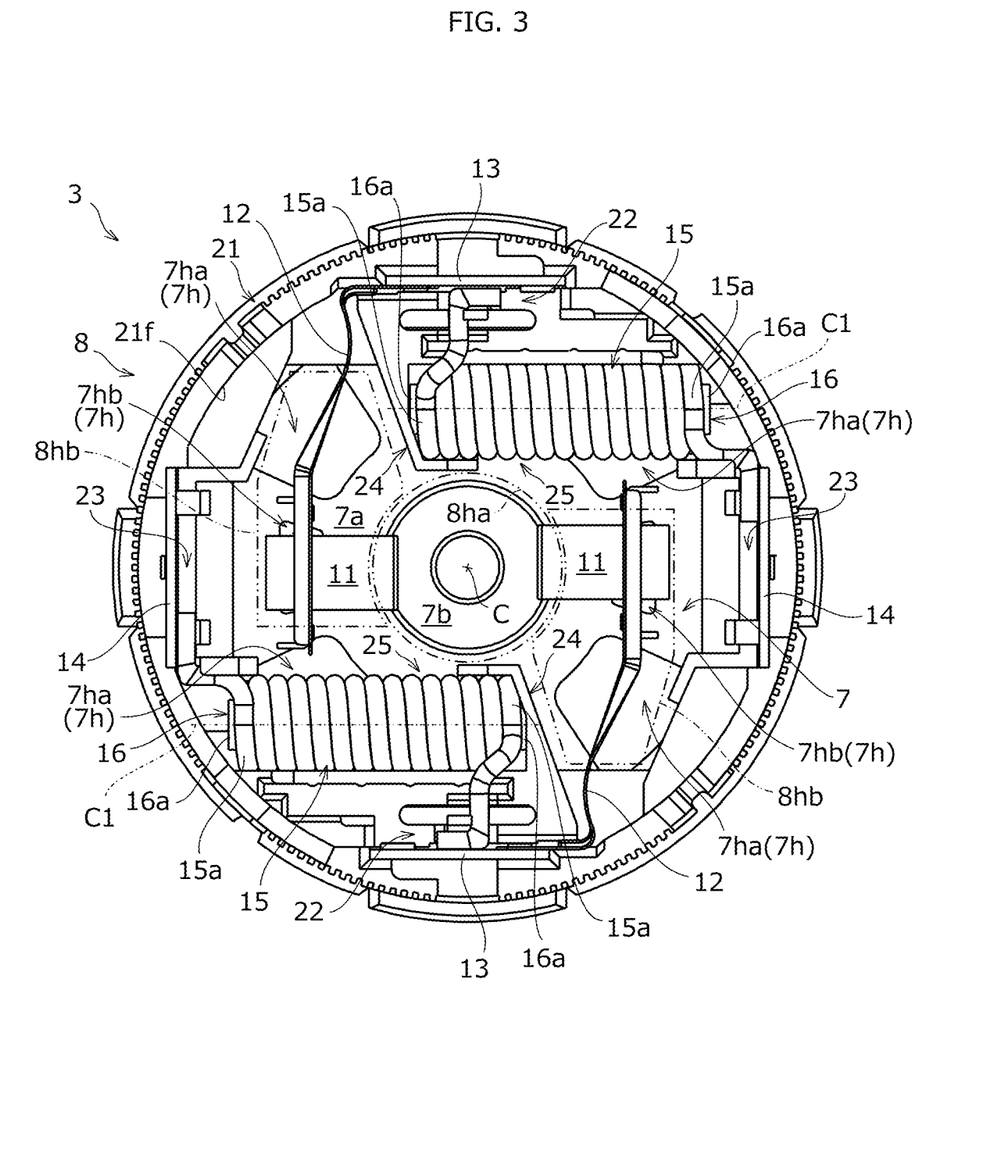
FIG. 3 is a front view of the end bell of the motor of FIG. 1 when viewed from the other of the axial direction.

The holder 8 is a member bonded to the end plate 7 in the other of the axial direction. As illustrated in FIG. 3, the holder 8 has an attachment portion 24 to which a choke coil 15 as an electrical element is attached, and an insertion hole 8ha (indicated by a two-dot chain line in FIG. 3) that penetrates holder 8 in the axial direction is formed around the rotation center C. The choke coil 15 is an electrical element that reduces electric noise, and is also referred to as a noise erasing element. The shaft 18 and the commutator of the rotor 4 is inserted into the insertion hole 8ha.

The holder 8 of the present embodiment has a cylindrical peripheral wall portion 21 fitted in the housing 2. The brush 11 is disposed inside the peripheral wall portion 21 and supported. The power supply terminal 14 may be attached to the holder 8. In the present embodiment, a pair of the brushes 11, a pair of the power supply terminals 14, and a pair of the choke coils 15 are provided in the holder 8, and are disposed substantially point-symmetrically with respect to the rotation center C.

The peripheral wall portion 21 of the holder 8 has a portion for attaching the components 11, 14, and 15 to the holder 8 inside thereof. More specifically, the peripheral wall portion 21 has a pair of support portions 22 for supporting the brush 11, a pair of holding portions 23 for holding the power supply terminal 14, and a pair of the above-described attachment portions 24 inside thereof. In a state in which the holder 8 and the end plate 7 are assembled as the end bell 3, that is, in a state illustrated in FIG. 3, both the pair of support portions 22 and the pair of holding portions 23 are provided at positions substantially not overlapping the air holes 7h of the end plate 7 when viewed in the axial direction. On the other hand, each of the pair of attachment portions 24 is provided at a position overlapping each of the two main air holes 7ha disposed opposite to each other with the rotation center C interposed therebetween in a wide range among the four main air holes 7ha provided in the end plate 7 when viewed in the axial direction.

A through hole 8hb (indicated by a two-dot chain line in FIG. 3) penetrating the holder 8 in the axial direction is provided inside the peripheral wall portion 21 at a position where at least part of the through hole 8hb overlaps the air hole 7h (the another air hole 7h) except for the two main air holes 7ha overlapping the attachment portion 24 when viewed in the axial direction. The through hole 8hb is provided so as to be connected to the insertion hole 8ha, and forms one hole inside the peripheral wall portion 21. In FIG. 3, the positions of the insertion hole 8ha and the through hole 8hb are virtually indicated by two-dot chain lines, but the shapes of the insertion hole 8*ha* and the through hole 8*hb* are not limited to the shapes illustrated in FIG. 3. The insertion hole 8*ha* is only required to have a shape through which at least the shaft 18 and the commutator of the rotor 4 can be inserted, and the through hole 8*hb* is only required to have a shape at least partially overlapping the another air hole 7*h*.

Hereinafter, the brush 11, the support portion 22, the power supply terminal 14, the holding portion 23, the choke coil 15, and the attachment portion 24 will be described in detail in this order.

The pair of brushes 11 is, for example, a carbon brush containing carbon as a main component. The pair of brushes 11 is disposed opposite to each other across the rotation center C in the radial direction, and is in sliding contact with the commutator of the rotor 4. In the present embodiment, the pair of brushes 11 is disposed at a position overlapping the respective sub air holes 7*hb* of the end plate 7 when viewed in the axial direction. In the present embodiment, each brush 11 is supported by the holder 8 by being connected to a brush terminal 13 held by support portion 22 via a brush arm 12. The brush terminal 13 is a metal terminal, and is disposed near an inner peripheral face 21*f* of the peripheral wall portion 21 at a position shifted clockwise by approximately 90 degrees from the brush 11. The brush terminal 13 may extend in the tangential direction with respect to the inner peripheral face 21*f* of the peripheral wall portion 21 at this position. The brush arm 12 is a thin plate-like member having conductivity, and the brush 11 is fixed to one end thereof. The other end of the brush arm 12 is bent and joined to the brush terminal 13.

The support portion 22 is a portion formed to bulge radially inward from part of the inner peripheral face 21*f* of the peripheral wall portion 21 to an extent that the support portion does not overlap the air hole 7*h* at a position corresponding to the above-described arrangement of the brush terminals 13. The support portion 22 has a groove in the extending direction of the brush terminal 13, and the brush terminal 13 is fitted into the groove and held with respect to the holder 8.

The pair of power supply terminals 14 are metal terminals. As illustrated in FIG. 1, each of the power supply terminals 14 is disposed at the holder 8 such that part thereof protrudes in one of the axial direction of the motor 1, and receives power supply from an external power supply. As illustrated in FIG. 3, the pair of power supply terminals 14 is disposed near the inner peripheral face 21*f* of the peripheral wall portion 21 at positions radially outward of the pair of brushes 11 and in substantially the same phase as the pair of brushes 11.

The holding portion 23 is a portion formed to bulge radially inward from part of the inner peripheral face 21*f* of the peripheral wall portion 21 to an extent that the holding portion does not overlap the air hole 7*h* at a position corresponding to the arrangement of the power supply terminal 14 described above. The holding portion 23 has a groove having a shape corresponding to the shape of the power supply terminal 14, and the power supply terminal 14 is fitted into the groove and held with respect to the holder 8.

Each of the pair of choke coils 15 is, for example, a cylindrical coil around which a metal wire is spirally wound. Each choke coil 15 is disposed such that its center line C1 extends perpendicularly to the axial direction, and is disposed at a position partially overlapping the main air hole 7*ha* of end plate 7 when viewed in the axial direction. The choke coil 15 of the present embodiment is disposed radially inside relative to the brush terminal 13, overlaps the main air hole 7*ha* in a wide range, and is disposed such that the center line C1 thereof is parallel to the extending direction of the brush terminal 13. One end of the winding wire forming each choke coil 15 is joined to the brush terminal 13 disposed radially outside each choke coil 15. The other end of the winding is joined to, for example, the power supply terminal 14 disposed at a position shifted by approximately 90 degrees clockwise with respect to the brush terminal 13 to which one end of the winding is joined.

On the center line C1 side of each choke coil 15, a columnar ferrite core 16 is substantially coaxially disposed and accommodated. In the present embodiment, the dimension of the ferrite core 16 in the direction of the center line C1 is set to be longer than the dimension of the choke coil 15 in the direction of the center line C1. Therefore, both end portions 16*a* of the ferrite core 16 in the direction of the center line C1 protrude to the outside of the choke coil 15 from both end portions 15*a* of the choke coil 15 in the direction of the center line C1.

Figure 4:
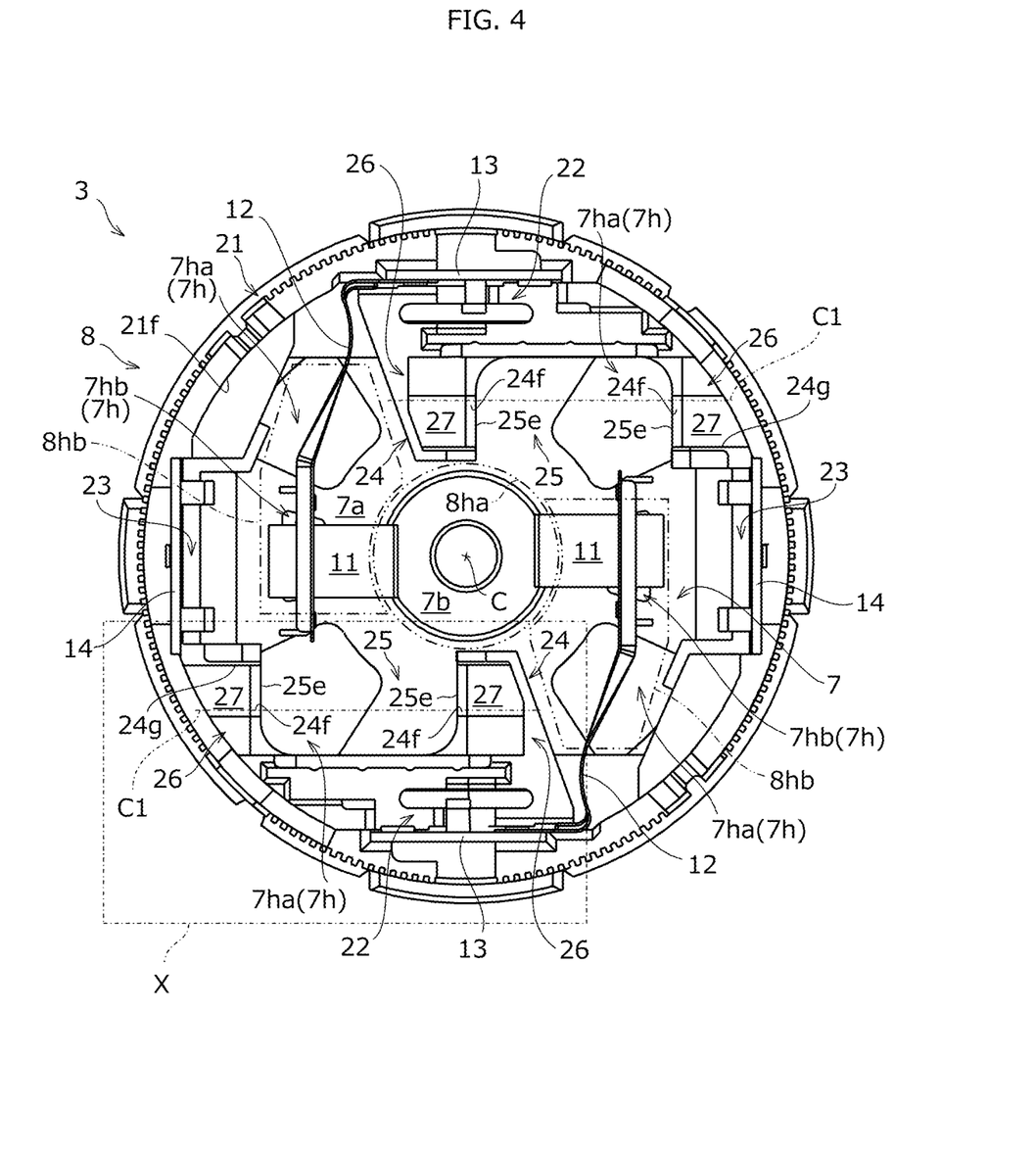
FIG. 4 is a front view of the end bell of FIG. 3 from which a choke coil is removed.

The attachment portion 24 is formed to bulge radially inward of the support portion 22 and extends in the direction of the center line C1 corresponding to the arrangement of the choke coil 15 described above. The attachment portion 24 has a vat shape having a space in which the choke coil 15 can be accommodated the other of the axial direction when it is assumed that the cutout portion 25 to be described later does not exist. More specifically, as illustrated in FIG. 4, the attachment portion 24 has a vat shape having a placement face 24*f* on which the choke coil 15 is placed from the other of the axial direction, and a side face 24*g* erected from the placement face 24*f* in the other of the axial direction and surrounding the choke coil 15. The choke coil 15 is accommodated in a space defined by the placement face 24*f* and the side face 24*g*, and is attached to the holder 8 by being bonded and fixed to the attachment portion 24 with an adhesive.

The placement face 24*f* is a face extending in the direction of the center line C1 when it is assumed that the cutout portion 25 and a recess 27 to be described later do not exist. The dimension of the placement face 24*f* in the direction of the center line C1 is set to be equal to or slightly longer than the dimension of the choke coil 15 in the direction of the center line C1 in order to enable the choke coil 15 to be placed on the placement face 24*f*. When the above-described ferrite core 16 is accommodated in the choke coil 15, the dimension of the placement face 24*f* in the direction of the center line C1 may be set to be equal to or slightly longer than the dimension of the ferrite core 16 in the direction of the center line C1 in consideration of the dimension of the ferrite core 16. The side face 24*g* is erected from the entire peripheral edge of the placement face 24*f* in other of the axial direction when it is assumed that the cutout portion 25 and the recess 27 do not exist. The side face 24*g* may include part of the inner peripheral face 21*f* of the peripheral wall portion 21.

Hereinafter, in the attachment portion 24, a portion where both end portions 15*a* of the choke coil 15 (and both end portions 16*a* of the ferrite core 16) are placed on the placement face 24*f* is referred to as an end placement portion 26. The end placement portion 26 may include a portion forming the side face 24*g* erected from the placement face 24*f* of this portion in addition to the placement face 24*f* of this portion. When the dimension of the choke coil 15 in the direction of the center line C1 is set to be longer than the dimension of the ferrite core 16 in the direction of the center line C1, both end portions 16*a* of the ferrite core 16 are preferably also placed on the end placement portion 26. As a result, when the both end portions 15a of the choke coil 15 and the end placement portion 26 are bonded and fixed, the both end portions 16a of the ferrite core 16 can be bonded and fixed to the end placement portion 26 via the both end portions 15a of the choke coil 15.

As described above, the attachment portion 24 overlaps the main air hole 7ha when viewed in the axial direction. Accordingly, at least part of attachment portion 24 overlapping the main air hole 7ha when viewed in the axial direction the cutout portion 25. The cutout portion 25 may be provided in the entire portion where part of the attachment portion 24 overlaps the main air hole 7ha, or may be provided in part of the portion where part of the attachment portion 24 overlaps the main air hole 7ha. In the attachment portion 24 of the present embodiment, a portion (part) excluding the end placement portion 26 is cut out as a cutout portion 25. That is, the attachment portion 24 is cut out as the cutout portion 25 except for only the two end placement portions 26 where the both end portions 15a of the choke coil 15 are disposed.

In the present embodiment, the cutout portion 25 is cut out from the rotation center C side of the shaft 1S, is connected to the insertion hole 8ha, and penetrates the attachment portion 24 in the axial direction. In other words, the cutout portion 25 is provided to expand the insertion hole 8ha from the insertion hole 8ha provided radially inside relative to the attachment portion 24. As described above, the insertion hole 8ha is also connected to the through hole 8hb. Therefore, it can be said that the cutout portion 25 is connected to both the insertion hole 8ha and the through hole 8hb to form one hole inside the peripheral wall portion 21.

Figure 5:
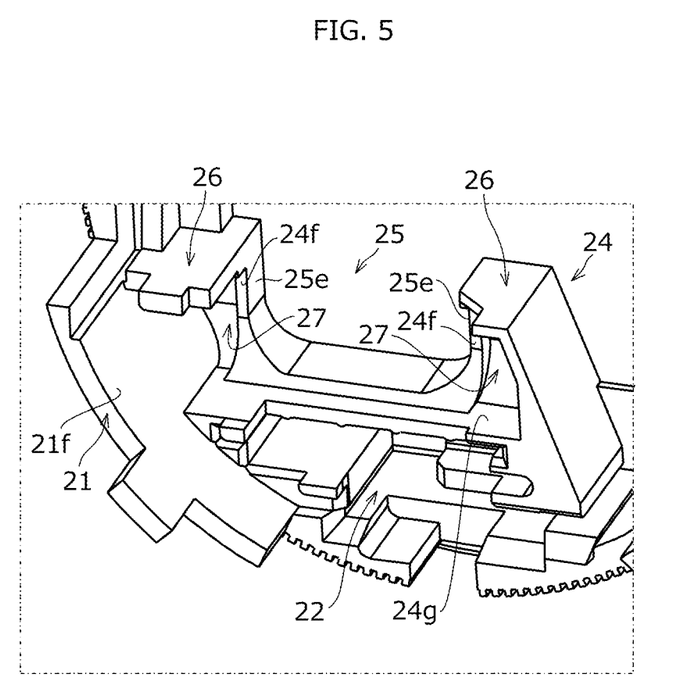
FIG. 5 is a perspective view of part (X portion in FIG. 4) of the holder of the end bell of FIG. 4 when viewed from the other of the axial direction.

Further, in the present embodiment, as illustrated in FIG. 5, each end placement portion 26 has the recess 27 recessed from the placement face 24f at a position separated from an end edge 25e forming the cutout portion 25 in the direction of the center line C1. The recess 27 is a portion (adhesive reservoir) where an adhesive is stored when the adhesive for fixing the choke coil 15 is applied. For example, the recess 27 is recessed in the entire end placement portion 26 except for only the end edge portion connected to the end edge 25e of the placement face 24f. The remaining portion (the rest of the end placement portion 26) functions as a wall that prevents leakage of the adhesive stored in the recess 27.

When the capacity of the recess 27 is larger than the amount (for example, 20 mg to 30 mg) of the adhesive applied to each of the both end portions 15a of the choke coil 15, the applied adhesive does not leak. However, when the recess 27 is formed to be large so that the capacity of the recess 27 is larger than the amount of the adhesive, it is necessary to increase the size of the portion of which the recess 27 is formed (that is, the end placement portion 26) accordingly, and as a result, it is difficult to increase the size of the cutout portion 25. Therefore, it is preferable that the capacity of the recess 27 be substantially equal to the amount of the adhesive. As a result, the end placement portion 26 can be optimized to have a size (or shape) capable of placing the both end portions 15a of the choke coil 15 (and the both end portions 16a of the ferrite core 16) and a size (or shape) capable of forming the recess 27 having a capacity equivalent to the amount of the adhesive.

[2. Action and Effect]

(1) In the motor 1 described above, at least part of the attachment portion 24 to which the electrical element (for example, the choke coil 15) is attached, the part overlapping the air hole 7h when viewed in the axial direction, has the cutout portion 25. With such a configuration, it is possible to prevent the air hole 7h (main air hole 7ha) which overlaps the attachment portion 24 from being closed by the attachment portion 24. Therefore, air can be easily taken into the inside of the motor 1 from the air hole 7h, so that the cooling effect inside the motor 1 can be enhanced. For example, the air taken in from the air hole 7h can cool not only a portion that easily generates heat, such as the brush 11 and a commutator in contact with the brush 11, but also an electrical element.

In addition, in the motor 1 described above, even when the electrical element is provided so as to overlap the air hole 7h, the cutout portion 25 can realize efficient cooling of the inside of the motor 1. That is, the arrangement of the electrical elements can be set in any manner without depending on the arrangement of the air holes 7h. Therefore, downsizing of the holder 8 and optimization of the shape of the holder 8 can be achieved. This contributes to downsizing of the motor 1.

(2) The attachment portion 24 has the recess 27 recessed from the placement face 24f at a position away from the end edge 25e forming the cutout portion 25. As a result, the adhesive applied to the electrical element can be stored in the recess 27 when the electrical element (for example, the choke coil 15) is adhered to the attachment portion 24. Therefore, it is possible to suppress leakage of the adhesive from the holder 8 beyond the end edge 25e, and it is possible to secure adhesive strength between the electrical element and the attachment portion 24.

(3) In attachment portion 24, a portion except for the end placement portion 26 on which both end portions 15a of choke coil 15 in the direction of the center line C1 are mounted is cut out as the cutout portion 25. In this way, when only the minimum portion (end placement portion 26) necessary for attaching the electrical element is secured, and the other portions are taken as the cutout portions 25, the size of the cutout portions 25 can be increased. As a result, it is possible to secure a large flow path for the air flowing in from the air hole 7h overlapping the attachment portion 24, and thus, it is possible to more easily take in the air and to enhance the cooling effect. In the attachment portion 24, the choke coil 15 can be fixed from both sides in the direction of the center line C1 by the end placement portion 26. Therefore, since the displacement of the choke coil 15 can be more reliably suppressed, the choke coil 15 can be prevented from falling off from the holder 8.

(4) The capacity of the recess 27 formed in each end placement portion 26 is ensured to be substantially equal to the amount of the adhesive applied to each end portion 15a of the choke coil 15 disposed in each end placement portion 26. As a result, leakage of the adhesive can be reliably suppressed, and the size of the end placement portion 26 in which the recess 27 is formed can be set to the minimum necessary. In other words, since the size and shape of each end placement portion 26 where both end portions 15a of the choke coil 15 are disposed can be optimized, the size of the cutout portion 25 can be increased accordingly. As a result, air can be more easily taken in, and the cooling effect can be enhanced.

(5) The holder 8 has the through hole 8hb at least partially overlapping another air hole 7h when viewed in the axial direction. Thus, the another air hole 7h can be prevented from being blocked by the holder 8, so that the cooling effect of the motor 1 can be enhanced. The through hole 8hb is connected to the insertion hole 8ha. Therefore, since the air flowing into the housing 2 from the another air hole 7h can be guided to the sliding contact portion between the brush 11, which is the main cooling target, and the commutator, the cooling effect of the motor 1 can be further enhanced.

(6) In the motor 1 described above, the cutout portion 25 is connected to the insertion hole 8ha. As a result, the air taken in from the air hole 7h overlapping the attachment portion 24 can be guided to the sliding contact portion between the brush 11 and the commutator, which is a portion that easily generates heat (main cooling target), so that the cooling inside the motor 1 can be more efficiently performed.

In addition, since the cylindrical peripheral wall portion 21 internally fitted to the housing 2 is provided, it is possible to easily align the end bell 3 with respect to the housing 2. Further, since holder 8 has the support portion 22, the brush 11 is supported by the holder 8.

In addition, in the holder 8 described above, each of the support portion 22, the holding portion 23, and the attachment portion 24 is formed to bulge from the inner peripheral face 21f of the peripheral wall portion 21. In other words, in the holder 8 described above, only the portions 22, 23, and 24 of the holder 8 are formed to bulge from the peripheral wall portion 21. As a result, a portion, inside the peripheral wall portion 21, where the respective portions 22, 23, and 24 are not formed can be widely used as the through hole 8hb, so that the cooling effect of the motor 1 can be further enhanced.

(7) The motor 1 described above has the fan 6, and the housing 2 has the lateral hole 2h. As a result, when the fan 6 rotates, the air can flow from the air hole 7h toward the lateral hole 2h or from the lateral hole 2h toward the air hole 7h, so that the cooling effect of the motor 1 can be enhanced.

[3. Others]

The configuration of the motor 1 described in the above-described embodiment is an example, and is not limited to the above-described configuration. The motor 1 may be, for example, a brushless motor. The motor 1 may be an outer rotor type motor. For example, the motor 1 may not include the fan 6, and the housing 2 may not have the lateral hole 2h. The electrical element attached to the holder 8 may not be the choke coil 15, and another electrical element may be attached instead of or in addition to the choke coil 15. Examples of other electrical elements include a capacitor for noise prevention and a circuit breaker for brush protection. The number of electrical elements is not particularly limited, and may be one or more.

The air hole 7h provided in the end plate 7 is not limited to those described above. The end plate 7 may have at least one air hole 7h overlapping the attachment portion 24. However, from the viewpoint of securing the strength of the end bell 3, the air holes 7h provided in the end plate 7 are preferably disposed point-symmetrically with respect to the rotation center C.

The holder 8 may not have the peripheral wall portion 21. The shapes of the support portion 22 and the holding portion 23 are not limited to those described above. When the motor of the present disclosure is applied to a brushless motor, the support portion 22 may be omitted. In the holder 8, the holding portion 23 may be omitted. In the holder 8, the through hole 8hb may not be connected to the insertion hole 8ha, or the through hole 8hb may be omitted. That is, the holder 8 is only required to have at least the attachment portion 24 to which the electrical element is attached and the insertion hole 8ha through which the shaft 1S is inserted.

The shape of the attachment portion 24 is also not limited to the above-described shape. At least part of the attachment portion 24 may overlap the air hole 7h when viewed in the axial direction. The attachment portion 24 is not limited to the above-described configuration, and only a portion overlapping the air hole 7h may be cut out as the cutout portion 25, or only part of a portion overlapping the air hole 7h may be cut out as the cutout portion 25. The cutout portion 25 may not be connected to the insertion hole 8ha. When the possibility of leakage of the adhesive is not considered, the recess 27 provided in the attachment portion 24 may be omitted. Alternatively, instead of the recess 27, for example, a protrusion (wall) may be provided on the placement face 24f to prevent leakage of the adhesive.

DESCRIPTION OF REFERENCE SIGNS

1 Motor
1S Shaft
2 Housing
2a Opening
2h Lateral hole
3 End bell
4 Rotor
5 Stator
6 Fan
7 End plate
7h Air hole
7ha Main air hole (air hole)
7hb Sub air hole (air hole)
8 Holder
8ha Insertion hole
8hb Through hole
11 Brush
15 Choke coil (electrical element)
15a Both end portions
16 Ferrite core
16a Both end portions
21 Peripheral wall portion
22 Support portion
24 Attachment portion
24f Placement face
25 Cutout portion
25e End edge
26 End placement portion
27 Recess
C Rotation center
C1 Center line

What is claimed is:

1. A motor comprising:
a bottomed cylindrical housing incorporating a rotor that rotates integrally with a shaft and a stator disposed to face the rotor in a radial direction of the shaft; and
an end bell having an end plate that closes an opening of the housing and a holder that is provided between the rotor and the end plate in an axial direction of the shaft and to which an electrical element is attached,
wherein the end plate has an air hole penetrating the end plate in the axial direction,
wherein the holder includes an attachment portion to which the electrical element is attached, and has an insertion hole through which the shaft is inserted,
wherein at least part of the attachment portion has a cutout portion, the part overlapping the air hole when viewed in the axial direction,
wherein the electrical element is adhesively fixed in a state of being placed on a placement face of the attachment portion,
wherein the attachment portion has a recess recessed from the placement face at a position away from an end edge forming the cutout portion, wherein the electrical element is a cylindrical choke coil in which a ferrite core is accommodated on a center side, and wherein the attachment portion has an end placement portion on which each of both end portions of the choke coil in a center line direction of the choke coil is placed, and the part excluding the end placement portion is the cutout portion.

2. The motor according to claim 1, wherein
a capacity of the recess is secured to be substantially equal to an amount of the adhesive applied to each of the both end portions, and
wherein the end placement portion has the recess.

3. The motor according to claim 1, wherein
the end plate has another air hole penetrating the end plate in the axial direction at a position away from the air hole and not overlapping the attachment portion when viewed in the axial direction, and wherein
the holder has a through hole at least part of which overlaps the another air hole when viewed in the axial direction, and has one hole where the through hole, the insertion hole, and the cutout portion are connected.

4. The motor according to claim 1, wherein
the holder includes a cylindrical peripheral wall portion fitted in the housing and a support portion that supports a brush, and wherein
the cutout portion is cut out from a rotation center side of the shaft and connected to the insertion hole.

5. The motor according to claim 1, further comprising:
a fan disposed between the rotor and the holder in the axial direction,
wherein the housing has a lateral hole penetrating in a radial direction at a position same as a position of the fan in the axial direction.

6. A motor comprising:
a bottomed cylindrical housing incorporating a rotor that rotates integrally with a shaft and a stator disposed to face the rotor in a radial direction of the shaft; and
an end bell having an end plate that closes an opening of the housing and a holder that is provided between the rotor and the end plate in an axial direction of the shaft and to which an electrical element is attached,
wherein the end plate has an air hole penetrating the end plate in the axial direction,
wherein the holder includes an attachment portion to which the electrical element is attached, and has an insertion hole through which the shaft is inserted,
wherein at least part of the attachment portion has a cutout portion, the part overlapping the air hole when viewed in the axial direction,
wherein the end plate has another air hole penetrating the end plate in the axial direction at a position away from the air hole and not overlapping the attachment portion when viewed in the axial direction, and wherein the holder has a through hole at least part of which overlaps the another air hole when viewed in the axial direction, and has one hole where the through hole, the insertion hole, and the cutout portion are connected.

7. The motor according to claim 6, wherein
the electrical element is adhesively fixed in a state of being placed on a placement face of the attachment portion, and
the attachment portion has a recess recessed from the placement face at a position away from an end edge forming the cutout portion.

8. The motor according to claim 6, wherein
the electrical element is a cylindrical choke coil in which a ferrite core is accommodated on a center side, and
the attachment portion has an end placement portion on which each of both end portions of the choke coil in a center line direction of the choke coil is placed, and the part excluding the end placement portion is a cutout portion.

9. The motor according to claim 6, wherein
the electrical element is adhesively fixed in a state of being placed on a placement face of the attachment portion, and is a cylindrical choke coil in which a ferrite core is accommodated on a center side,
the attachment portion has a recess recessed from the placement face at a position away from an end edge forming the cutout portion and an end placement portion on which each of both end portions of the choke coil in a center line direction of the choke coil is placed, and the part excluding the end placement portion is the cutout portion,
a capacity of the recess is secured to be substantially equal to an amount of an adhesive applied to each of the both end portions, and
the end placement portion has the recess.

10. The motor according to claim 6, wherein
the holder includes a cylindrical peripheral wall portion fitted in the housing and a support portion that supports a brush, and
the cutout portion is cut out from a rotation center side of the shaft and connected to the insertion hole.

11. The motor according to claim 6, further comprising:
a fan disposed between the rotor and the holder in the axial direction,
wherein the housing has a lateral hole penetrating in a radial direction at a position same as a position of the fan in the axial direction.

* * * * *